9332X
A. Allan,
Hoe
Patented Jan. 23. 1836.
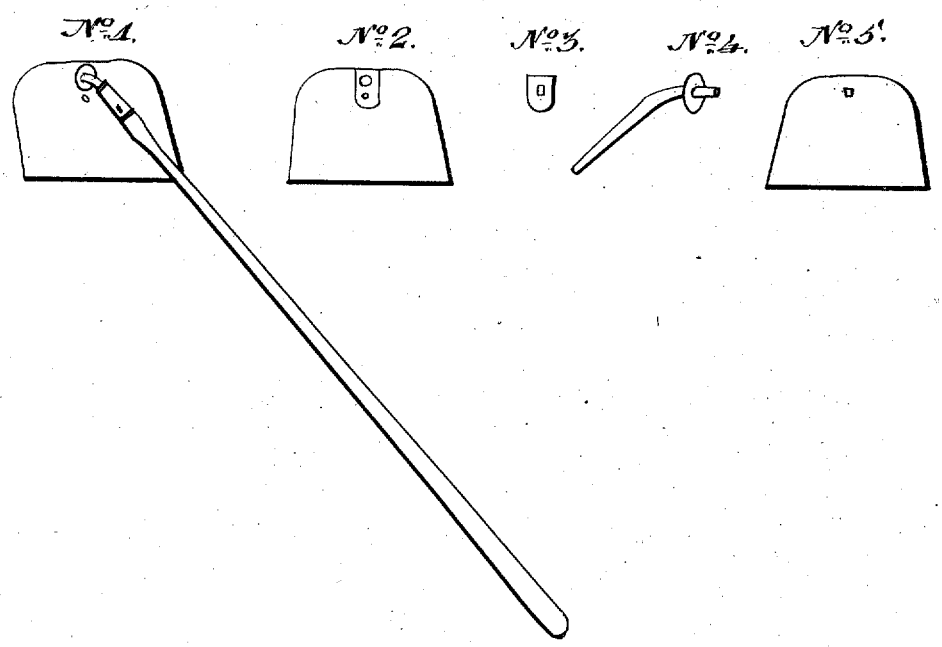
N. PETERS, PHOTO-LITHOGRAPHER, WASHINGTON, D. C.

9332X

UNITED STATES PATENT OFFICE.

ADNA ALLEN, OF RAMAPO, NEW YORK.

GARDEN OR FIELD HOE.

Specification forming part of Letters Patent dated January 23, 1836.

*To all whom it may concern:*

Be it known that I, ADNA ALLEN, of Ramapo, in the county of Rockland and State of New York, have invented a new and useful Improvement in Garden or Field Hoes; and I do hereby declare that the following is a full and exact description thereof.

The plate of the hoe is perforated by a square hole. (See No. 5 in accompanying drawing.) Through the side hole is introduced the square end of a collared shank, as in No. 4 of this drawing. The collar supports the frout or handled side of the hoe-plate when forced home, or the square, which is somewhat tapering to the base, in order to prevent any friction of the plate on the shank in working. This plate or back piece, No. 3, is then placed on the residue of the shank, enough of which is still left to form an efficient rivet. (See No. 2.) Still further, in order to prevent the collision of the edge of the plate on the square where it is inserted and give additional strength to the back plate, a small rivet, as seen in Nos. 1 and 2, connects it with the main plate. The shank is secured in the handle by a ferrule and fastened by a key driven through the ferrule-handle and shank.

What I claim as my own invention and not previously known in the above-described hoe is—

The collared shank, back plate, and rivets—viz., the collar on the shank and the principle of attaching the back plate to the plate of the hoe.

ADNA ALLEN.

Witnesses:
ANTHONY HOUSTON,
JNO. L. WELLING.